(12) United States Patent  
Fenger

(10) Patent No.: US 8,052,818 B2
(45) Date of Patent: Nov. 8, 2011

(54) METHOD AND SYSTEM FOR APPLYING AN ENCIRCLING SEAL TO A CLOSURE OF AN OPENING, IN PARTICULAR OF A DOOR, OF A MOTOR VEHICLE

(75) Inventor: Norbert Fenger, Schwalbach/Elm (DE)

(73) Assignee: ThyssenKrupp Drauz Nothelfer GmbH, Heibronn (DE)

( * ) Notice: Subject to any disclaimer, the term of this patent is extended or adjusted under 35 U.S.C. 154(b) by 358 days.

(21) Appl. No.: 12/160,967

(22) PCT Filed: Jan. 18, 2007

(86) PCT No.: PCT/EP2007/050500
§ 371 (c)(1),
(2), (4) Date: Sep. 11, 2008

(87) PCT Pub. No.: WO2007/082915
PCT Pub. Date: Jul. 26, 2007

(65) Prior Publication Data
US 2010/0175814 A1     Jul. 15, 2010

(30) Foreign Application Priority Data

Jan. 20, 2006 (DE) .................. 10 2006 003 095

(51) Int. Cl.
*B29C 65/00* (2006.01)
(52) U.S. Cl. .............. 156/160; 29/446; 29/450; 29/451; 156/304.1; 156/494; 156/495; 156/496; 156/502; 156/503

(58) Field of Classification Search ............ 29/446–451, 29/235; 156/160, 165, 304.1, 304.2, 494–496, 156/502, 503
See application file for complete search history.

(56) References Cited

U.S. PATENT DOCUMENTS

| 4,653,166 A * | 3/1987 | Bright | 29/235 |
| 5,121,532 A * | 6/1992 | Massie | 29/235 |
| 2005/0193544 A1* | 9/2005 | Supina et al. | 29/450 |

(Continued)

FOREIGN PATENT DOCUMENTS

DE            19704327         5/1998
(Continued)

OTHER PUBLICATIONS

International Search Report for PCT/EP2007/050500.

*Primary Examiner* — Khanh P Nguyen
*Assistant Examiner* — Carson Gross
(74) *Attorney, Agent, or Firm* — Proskauer Rose LLP

(57) ABSTRACT

A method and a system for applying a seal to the closure of an opening, in particular to a door of a motor vehicle, is provided. The application takes place in two stages. In a first stage, a seal, which is cut off from a continuous seal strip is placed with a stationary roll-on head on placing and pressing elements of a tensioning plate, which are moved past the roll-on head. In a second stage, the tensioning plate with the seal placed on the placing and pressing elements is guided to the closure of the opening and pressed here by means of the pressing elements on the bonding face of the closure of the opening. In general, this type of application takes place exclusively by mechanical means.

7 Claims, 4 Drawing Sheets

U.S. PATENT DOCUMENTS

Figure 1:
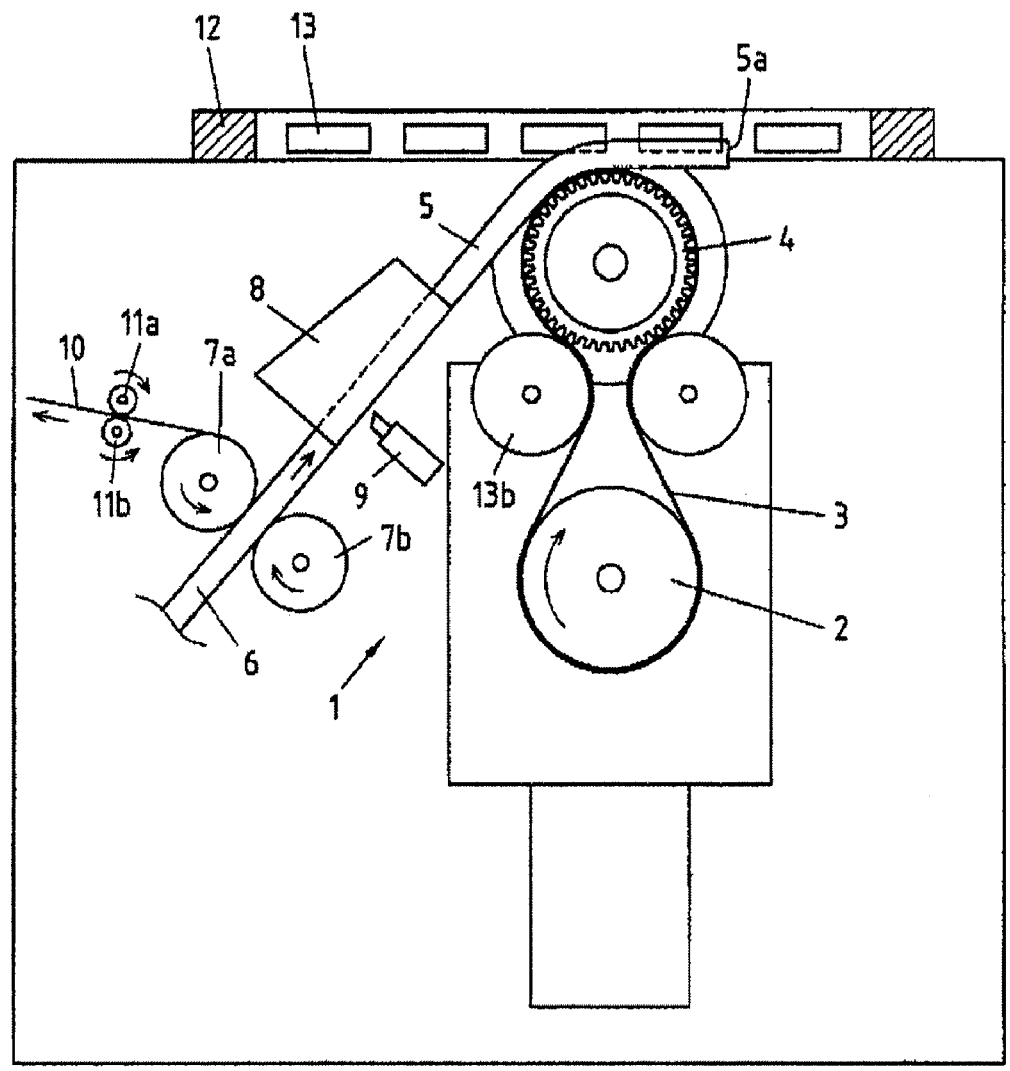

2006/0070224 A1   4/2006   Gratien et al. .................. 29/451

FOREIGN PATENT DOCUMENTS

| | | | |
|---|---|---|---|
| DE | 10138781 | * | 2/2003 |
| EP | 0849106 | * | 6/1998 |
| FR | 2646370 | | 11/1990 |
| GB | 2244302 | | 11/1991 |
| WO | 03091055 | | 11/2003 |
| WO | WO 2006/111489 | * | 10/2006 |

* cited by examiner

METHOD AND SYSTEM FOR APPLYING AN ENCIRCLING SEAL TO A CLOSURE OF AN OPENING, IN PARTICULAR OF A DOOR, OF A MOTOR VEHICLE

CROSS-REFERENCE TO RELATED APPLICATIONS

This application is a National Phase Application of International Application No. PCT/EP2007/050500, filed on Jan. 18, 2007, which claims the benefit of and priority to German patent application no. DE 10 2006 003 095.8-21, filed Jan. 20, 2006. The disclosure of the above applications are incorporated herein by reference in their entirety.

FIELD OF THE INVENTION

The invention relates to a method for applying a circumferential seal to the closure of an opening, in particular to a door, of a motor vehicle, in which the seal, which is held in a stretched manner as a closed ring by placing and pressing elements of a tensioning plate, which are distributed over the entire length of the seal, is guided in a precisely fitting manner with a free adhesive face onto a bonding face of the closure of the opening and is pressed on over its entire length before being released from the placing and pressing elements.

BACKGROUND

A known method of this type (EP 0 849 106 B1) takes as its starting point an annular seal, which is placed on the placing and pressing elements of a tensioning plate. This tensioning plate is used to guide the seal onto the closure of the opening, for example a motor vehicle door, which seal is supported by a mount. Between the mount and the tensioning plate there are reference points, which ensure that the seal is guided and applied in a precisely fitting manner. This type of applying a seal to a motor vehicle door has been used in practice for a long time. The complex placing of the annular seal on the placing and pressing elements, which is done by hand, is however considered disadvantageous. This also leads to increased production costs such as the manufacture of a completely closed sealing ring in a separate operation before placing on the tensioning plate.

In addition, there are purely mechanical methods, in which the seal is cut to length from a seal strip by means of a roll-on head and applied to the closure of the opening in one operation. However, problems with regard to process reliability can occur with this method.

In a known method and a known device (DE 101 38 781 A1), one or a plurality of guiding means can be provided for the seal profile, which guiding means are provided between the point at which it is pulled off from a supply roll and the point at which it is brought into contact with the application location on the component. The guiding means are preferably configured as driven guide rollers. In this method and this device, the seal profile can therefore move more or less freely between the guiding means and the pressing roller, and therefore also the application location, but experience shows that exact positioning of the seal profile at the application location is not guaranteed in this manner.

In another known method and another known device (WO 03/091055 A1), guiding means in the form of driven rollers are also arranged upstream of the pressing roller at the application location. In addition, the pressing face of the pressing roller is profiled, in particular grooved, in order to receive a web, which is arranged on the back of the seal profile. Although there is an additional guide at the application location, the use of such a device is limited to seal profiles with a corresponding profile geometry, in particular with webs arranged on the back.

Finally, a method for applying a circumferential seal to the closure of an opening, in particular to a sun roof of a motor vehicle, is known (DE 197 04 327 C1), in which a self-adhesive continuous seal strip is cut to length from a supply roll by means of an application device and adhesively bonded directly to the closure of the opening by means of a roll-on roller of the application device. The application device is arranged such that it can be displaced along the closure of the opening on a frame, which corresponds to the profile of the closure of the opening, with it being possible to control the height and direction of the roll-on roller. The constructive effort of the application device to be expended for this is great.

SUMMARY OF THE INVENTION

In general, the invention relates to a method and a system for applying a seal to the closure of an opening, with which a seal is placed securely and precisely on the sealing location of the closure of the opening without complex manual work.

In general, a method in accordance with an embodiment of the invention, provides that the seal is cut to length from a continuous seal strip by means of a stationary roll-on head and is placed on placing and pressing elements, by the tensioning plate with the placing and pressing elements being moved past the roll-on head, and in that the seal is then adhesively bonded flush at its two ends to form a ring.

In the method according to the invention, the advantageous aspects of the techniques known per se of applying a seal, which is prefabricated as a closed ring, by means of a tensioning plate and directly applying the seal from a continuous seal strip are combined, so that the application is carried out on the whole with low outlay and a very high level of precision. The fabrication of a closed seal ring in an upstream operation, as is usual in the conventional tensioning plate technique, is no longer necessary.

In order to guide the seal to the application location without problems on the one hand and to facilitate its positioning at the application location on the other hand, the seal can be widened radially after its two ends have been joined to form a closed seal ring. This seal then assumes the desired position after it has been released from the placing and pressing elements.

The seal is usually bonded to the closure of the opening with adhesive. This type of bonding is particularly advantageous if, when the seal strip, which is covered on its adhesive face with a protective film, is cut to length, the protective film is pulled off. The application of adhesive is then omitted. Continuous seal strips, which are correspondingly provided with adhesive and protective film can therefore be used in a cost-effective manner.

In general, other embodiments of the invention are related to a system for applying a circumferential seal to the closure of an opening, in particular to a door of a motor vehicle, in particular for use in the described method. This system has a first station, which has a stationary roll-on head with transporting and guiding means and cutting means for the seal, which can be cut to length from a seal strip, and a tensioning plate, which can be moved with respect to the roll-on head, with placing and pressing elements whose positions can be adapted in correspondence with the contour of the bonding face of the seal on the closure of the opening, and further comprises a second station, in which the tensioning plate and the closure of the opening can be brought together in a precisely fitting manner with transporting and holding means, and the placed-on seal can be pressed onto the bonding face of the closure of the opening with the pressing elements.

DETAILED DESCRIPTION OF THE DRAWINGS

Figure 2:
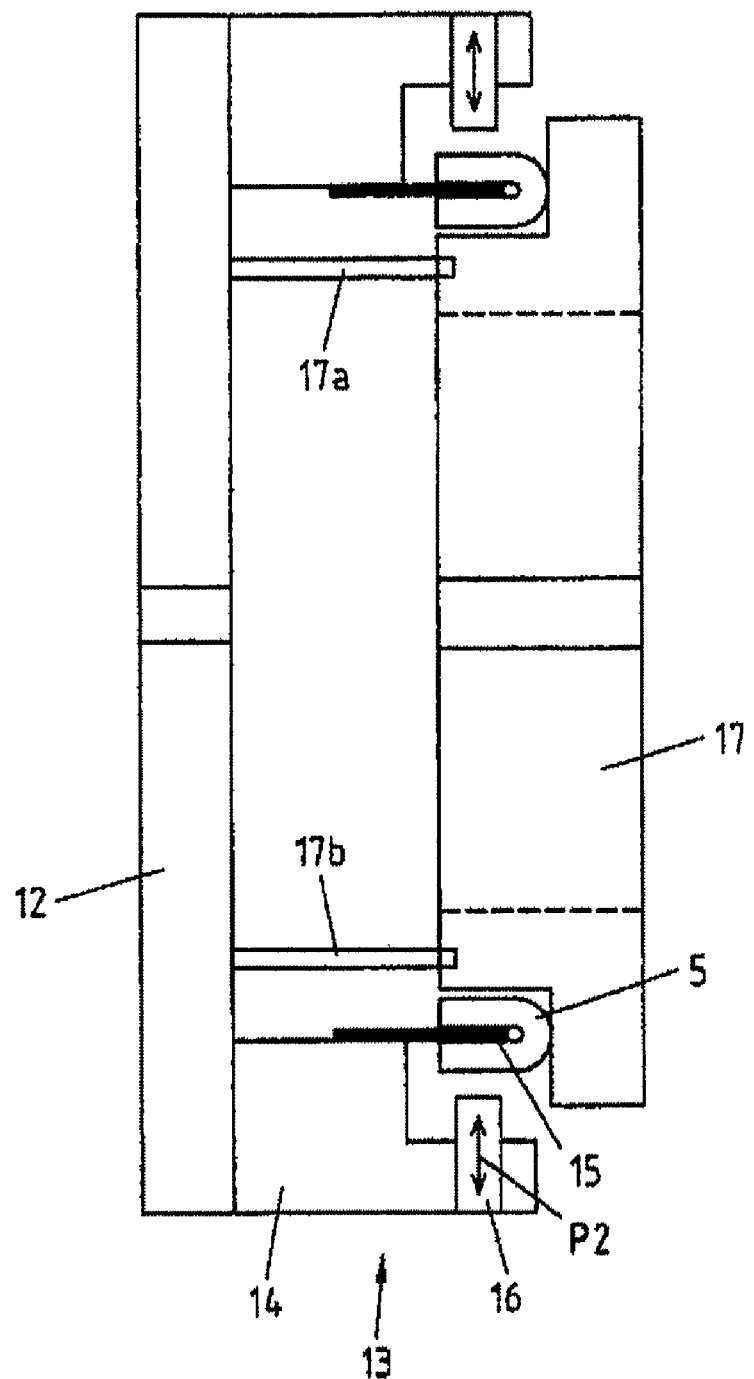
Figure 3:
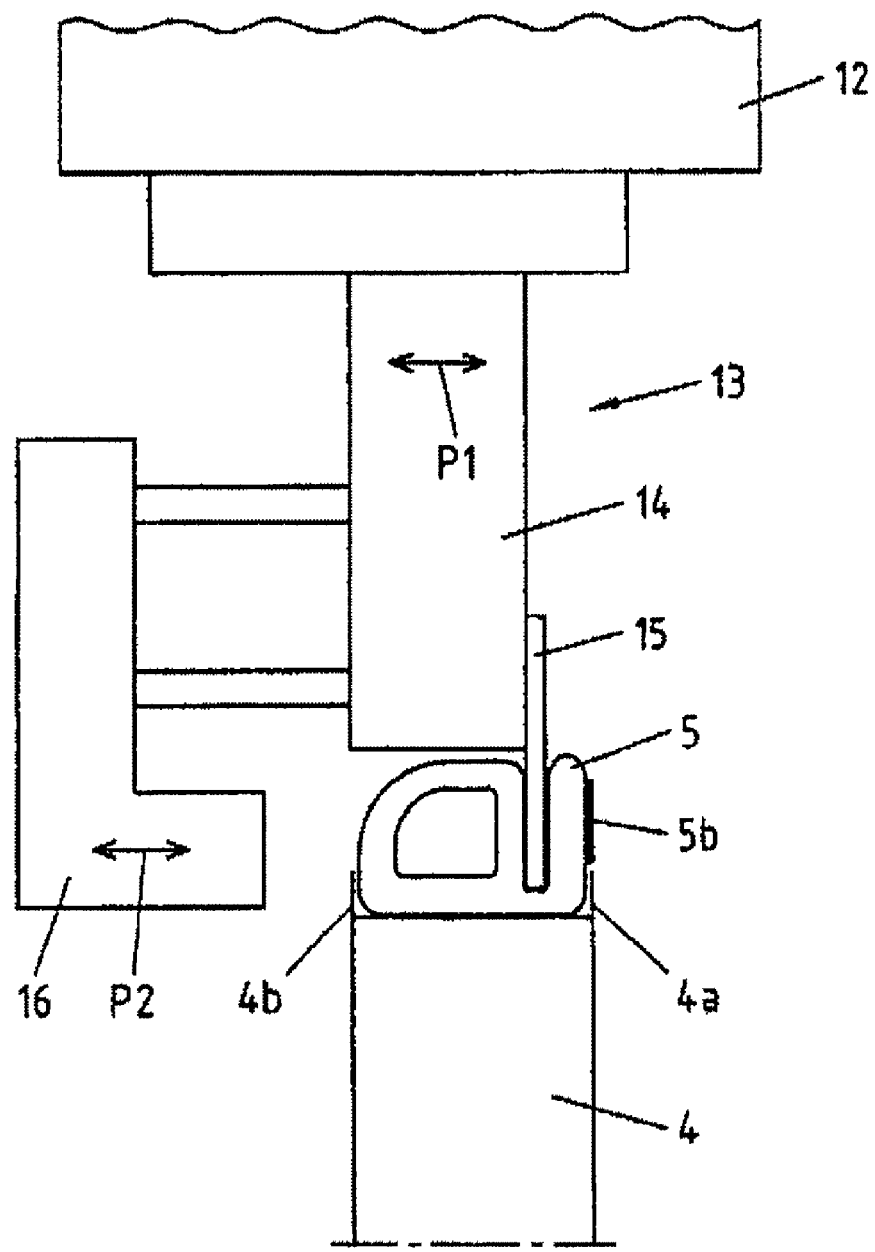
Figure 4:
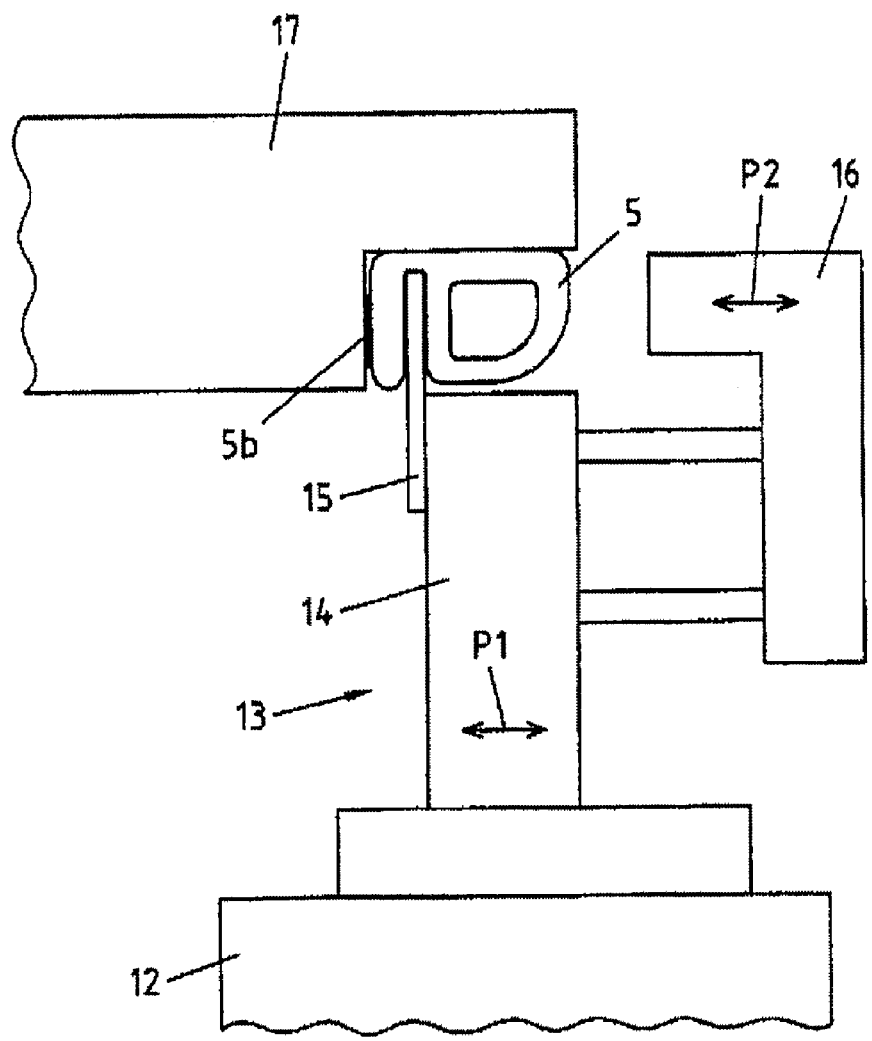

The invention is explained below in more detail using a system for applying a seal to a motor vehicle door, which comprises two stations. In the figures:

FIG. 1 shows the first station of the system with a stationary roll-on head and a tensioning plate which can be moved with respect to the roll-on head, FIG. 2 shows the second station with the tensioning plate and the motor vehicle door, FIG. 3 shows an enlarged section of the first station while the seal is being placed by means of the roll-on head and FIG. 4 shows an enlarged section of the second station while the seal is being applied to the motor vehicle door.

The first station shown in FIG. 1 comprises a stationary roll-on head 1 with a pressing roller 4, which is driven by a drive 2 by means of a belt 3. The pressing roller 4 can have lateral flanges 4a, 4b in order to guide a seal 5 to be applied. The seal 5 is pulled off from a continuous seal strip 6 from a supply roll (not shown) by means of transporting means 7a, 7b, which are configured as rollers, and guided by means of a guiding unit 8 to the pressing roller 4. A blade is assigned as the cutting means 9 to the seal in the region of the guiding unit 8. The continuous seal strip 6 has on one side an adhesive face, which is covered by a covering film 10. The covering film 10 is pulled off from the continuous seal strip 6 by means of a pair of pull-off rollers 11a, 11b before it reaches the guiding unit 8.

The first station includes a tensioning plate 12, which is fitted with a plurality of placing and pressing elements 13. These placing and pressing elements 13 are well known both in practice and in the prior art (EP 0 849 106 B1) mentioned in the introduction. The placing and pressing elements 13 can be arranged on the tensioning plate 12, which does not need to be a closed plate in the conventional sense, but can also be a frame or mount or the like, so that they precisely match the contour of the respective vehicle door where the seal is to be applied. The placing and pressing elements 13 consist essentially of a base body 14, which can be adjusted in the direction of the arrow P1 (see FIGS. 1 and 4), a holding bar 15 in the form of a spring-elastic tongue, which is fixed to the base body, and a pressing element 16, which can be adjusted in the direction of the arrow P2 (see FIGS. 3 and 4).

In the described first station, the seal 5 is placed on the holding bar 15 by means of the pressing roller 4. After the process of placing the cut off seal 5 has finished, the ends 5a of the seal 5 are adhesively bonded flush with each other so that a closed seal ring is produced. The seal 5 is then prepared for application to the motor vehicle door.

As shown in FIG. 2, a motor vehicle door 17 is guided to the tensioning plate 12 in the second station. This takes place by means of guiding and transporting means (not shown). So that the door 17 can be guided in a precisely fitting manner to the tensioning plate 12, so-called as reference points are provided between the two parts, which are shown schematically in FIG. 2 by webs 17a, 17b. In order to facilitate the positioning of the seal 5 on the door 17 and to optimize its later fit, the seal 5 placed on the holding bars 15 of the different placing and pressing elements 13 can be widened. The adjustment of the base 13 shown schematically by the double arrow is provided for this purpose. As soon as the door 17 has reached the desired position with respect to the tensioning plate 12, the pressing elements 15 start to function. The seal 5 is thereby pressed with its free adhesive face 5b (FIG. 3) against the bonding face on the periphery of the door 17. After the pressing elements 16 have been released, the door 17 can be removed from the tensioning plate 12, and in the process the seal 5, which is now adhesively bonded to the door 17, is pulled off from the holding bar 15.

The invention claimed is:

1. Method for applying a circumferential seal including a free adhesive face to a closure of an opening for a motor vehicle, in which the circumferential seal, which is held in a stretched manner as a closed ring by placing and pressing elements of a tensioning plate, which are distributed over an entire length of the circumferential seal, is guided in a precisely fitting manner with a its free adhesive face onto a bonding face of the closure and pressed on over its entire length before being released from the placing and pressing elements, wherein the circumferential seal is cut to length from a continuous seal strip by means of a stationary roll-on head and is placed on the placing and pressing elements by the tensioning plate with the placing and pressing elements being moved past the roll-on head, and is then adhesively bonded flush at two ends of the circumferential seal to form a ring, wherein the circumferential seal is widened radially after the two ends of the circumferential seal have been joined, wherein the circumferential seal is guided in its radially widened stated to a periphery of the closure, and wherein the circumferential seal is pressed on the periphery of the closure over its entire length before being released from the placing and pressing elements.

2. Method according to claim 1, wherein as the continuous seal strip, which is covered with a protective film on its adhesive face, is cut to length, the protective film is pulled off.

3. System for applying a circumferential seal to a closure of for an opening of a motor vehicle comprising:
   a first station, which has a stationary roll-on head with transporting and guiding means and cutting means for the circumferential seal, which can be cut to length from a continuous seal strip, and a tensioning plate, which can be moved with respect to the roll-on head,
   placing and pressing elements whose positions can be adapted in correspondence with the contour of a bonding face of the circumferential seal on the closure, wherein the respective placing and pressing element comprises a bidirectional adjustable base body, a holding bar in the form of a spring elastic tongue, which is fixed to the base body, and a bidirectional adjustable pressing element, and
   a second station, in which the tensioning plate and the closure can be brought together in a precisely fitting manner with transporting and holding means, and the placed-on circumferential seal can be pressed onto the bonding face of the closure with the placing and pressing elements.

4. System according to claim 3, wherein the first station comprises a pair of pull-off rollers for pulling off a covering film from the continuous seal strip.

5. System according to claim 3, wherein the roll-on head is provided with a pressing roller, which is driven by a drive by means of a belt.

6. System according to claim 5, wherein the pressing roller comprises lateral flanges for guiding the circumferential seal to be applied.

7. System according to claim 3, wherein the cutting means is assigned to the circumferential seal in the region of the guiding means.

* * * * *